United States Patent
Chen

(10) Patent No.: US 11,328,687 B2
(45) Date of Patent: May 10, 2022

(54) DISPLAY ADJUSTMENT METHOD, DISPLAY ADJUSTMENT APPARATUS, DISPLAY DEVICE, COMPUTER DEVICE AND STORAGE MEDIUM

(71) Applicants: K-TRONICS (SUZHOU) TECHNOLOGY CO., LTD., Jiangsu (CN); BOE TECHNOLOGY GROUP CO., LTD., Beijing (CN)

(72) Inventor: Ming Chen, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 310 days.

(21) Appl. No.: 16/609,510

(22) PCT Filed: Apr. 23, 2019

(86) PCT No.: PCT/CN2019/083774
§ 371 (c)(1),
(2) Date: Oct. 30, 2019

(87) PCT Pub. No.: WO2019/223479
PCT Pub. Date: Nov. 28, 2019

(65) Prior Publication Data
US 2021/0366434 A1   Nov. 25, 2021

(30) Foreign Application Priority Data
May 24, 2018   (CN) .......................... 201810507892.2

(51) Int. Cl.
*G09G 5/02*    (2006.01)
*G09G 5/10*    (2006.01)
(Continued)

(52) U.S. Cl.
CPC .............. *G09G 5/10* (2013.01); *G06F 3/013* (2013.01); *G06V 40/168* (2022.01);
(Continued)

(58) Field of Classification Search
CPC ... G09G 2320/0626; G09G 2320/0666; G09G 2320/062; G09G 2320/066; G09G 2320/06
See application file for complete search history.

(56) References Cited

U.S. PATENT DOCUMENTS

2015/0116207 A1   4/2015   Chen
2017/0294175 A1  10/2017   Chen et al.
2018/0108294 A1   4/2018   Kwon et al.

FOREIGN PATENT DOCUMENTS

CN   101483739 A    7/2009
CN   102737619 A   10/2012
(Continued)

OTHER PUBLICATIONS

Second Office Action for Chinese Patent Application No. 201810507892.2 dated May 18, 2020.
(Continued)

*Primary Examiner* — Weiming He
(74) *Attorney, Agent, or Firm* — Calfee, Halter & Griswold LLP

(57) ABSTRACT

A display adjustment method and apparatus, the apparatus comprises a display device, a computer device and a storage medium. The method comprises collecting a user's personal feature information or usage information of the user using the display device and adjusting a display effect of the display device according to at least one of the personal feature information and the usage information.

18 Claims, 4 Drawing Sheets

(51) Int. Cl.
*G06F 3/01* (2006.01)
*G06V 40/16* (2022.01)
(52) U.S. Cl.
CPC .......... *G06V 40/172* (2022.01); *G06V 40/178* (2022.01); *G09G 2320/0626* (2013.01); *G09G 2320/0666* (2013.01); *G09G 2340/0407* (2013.01); *G09G 2340/14* (2013.01)

(56) References Cited

FOREIGN PATENT DOCUMENTS

| | | | | | |
|---|---|---|---|---|---|
| CN | 103745576 | A | 4/2014 | | |
| CN | 103903591 | A | 7/2014 | | |
| CN | 107863089 | * | 9/2014 | ............... | G09G 5/02 |
| CN | 104335144 | A | 2/2015 | | |
| CN | 106057171 | * | 7/2016 | ............... | G09G 3/01 |
| CN | 106057171 | A | 10/2016 | | |
| CN | 106598532 | A | 4/2017 | | |
| CN | 106855781 | A | 6/2017 | | |
| CN | 107391062 | A | 11/2017 | | |
| CN | 107863089 | A | 3/2018 | | |
| CN | 107967052 | A | 4/2018 | | |
| CN | 108711407 | A | 10/2018 | | |

OTHER PUBLICATIONS

First Office Action for Chinese Patent Application No. 201810507892.2 dated Sep. 3, 2019.

* cited by examiner

DISPLAY ADJUSTMENT METHOD, DISPLAY ADJUSTMENT APPARATUS, DISPLAY DEVICE, COMPUTER DEVICE AND STORAGE MEDIUM

CROSS REFERENCE TO RELATED APPLICATIONS

The present application is a 35 U.S.C. 371 national stage application of PCT International Application No. PCT/CN2019/083774, filed on Apr. 23, 2019, which claims the benefit of Chinese Patent Application No. 201810507892.2, filed on May 24, 2018, the entire disclosures of which are incorporated herein by reference.

FIELD

The present disclosure relates to the field of display technologies, and particularly to a display adjustment method, a display adjustment apparatus, a display device, a computer device and a storage medium.

BACKGROUND

With the increasingly fierce competition in the society, many office workers have to face display devices such as computers and mobile phones for hours at a time. Even during non-working hours, people often entertain or communicate with their family members through electronic devices having a display screen. Viewing the display devices too long will greatly affect the health of eyes, for example, cause eye fatigue and cause damage to eyes such as myopia.

SUMMARY

With respect to drawbacks of the manners in the prior art, the present disclosure provides a display adjustment solution to more effectively reduce the impact of a display device on the eye health of a user.

Exemplary embodiments provide a display adjustment method, comprising:
collecting a user's personal feature information and usage information of the user using a display device; and
adjusting a display effect of the display device according to at least one of the personal feature information or the usage information.

In certain exemplary embodiments, the personal feature information comprises: age information and eyesight information. The usage information comprises: usage time information indicating a usage duration of the user using the display device, and distance information indicating a distance between the user's eyes and the display device, and view angle information indicating an angle of the user's line of sight relative to the display device. The adjusting the display effect of the display device comprises: adjusting one or more of display parameters of the display device according to at least one of the personal feature information or the usage information.

In certain exemplary embodiments, the display parameters comprise resolution, brightness, contrast, blue light intensity, color density and sharpness of a whole display area of the display device, and block color density and block brightness for some display blocks of the display device.

In certain exemplary embodiments, the adjustment of a display effect of the display device according to at least one of the personal feature information or the usage information comprises at least one of following steps: adjusting the resolution of the display device according to the age information and the eyesight information; adjusting the brightness and blue light intensity of the display device according to the distance information and the usage time information; adjusting the color density and sharpness of the display device according to the distance information; adjusting the block color density and the block brightness of the display device according to the view angle information.

In certain exemplary embodiments, the adjustment of the resolution of the display device according to the age information and the eyesight information comprises: determining according to the age information whether the user's age belongs to a preset age group; if the user's age belongs to the preset age group, determining according to the eyesight information whether the user's eyesight falls within a preset eyesight range, and if yes, adjusting the resolution of the display device to a first preset resolution, otherwise, adjusting the resolution of the display device to a second preset resolution; and if the user's age does not belong to the preset age group, adjusting the resolution of the display device to a second preset resolution.

In certain exemplary embodiments, the adjustment of the brightness of the display device according to the distance information and the usage time information comprises: determining a current distance between the user's eyes and the display device according to the distance information, and determining a usage duration of the user using the display device this time according to the usage time information; determining a first brightness compensation value of the display device according to the current distance, and determining a second brightness compensation value of the display device according to the current usage time; determining a brightness adjustment value of the display device according to a brightness reference value, the first brightness compensation value and the second brightness compensation value of the display device; and adjusting the brightness of the display device according to the brightness adjustment value.

In certain exemplary embodiments, the the adjustment of the blue light intensity of the display device according to the distance information and the usage time information comprises: determining a current distance between the user's eyes and the display device according to the distance information, and determining a usage duration of the user using the display device this time according to the usage time information; determining a distance coefficient of the display device according to the current distance, and determining a time coefficient of the display device according to the current usage time; determining a blue light intensity adjustment value of the display device according to a blue light intensity reference value, the distance coefficient and the time coefficient of the display device; and adjusting the blue light intensity of the display device according to the blue light intensity adjustment value.

In certain exemplary embodiments, the adjustment of the color density and sharpness of the display device according to the distance information comprises: determining according to the distance information whether a current distance between the user's eyes and the display device is equal to a preset reference distance; if yes, adjusting the color density and the sharpness of the display device according to a preset color density reference value and a preset sharpness reference value; and if not, determining a distance interval to which the current distance between the user's eyes and the display device belongs, and adjusting the color density and the sharpness of the display device according to a color density value and a sharpness value corresponding to the distance interval.

In certain exemplary embodiments, the adjustment of the block color density and the block brightness of the display device according to the view angle information comprises: determining, according to the view angle information, whether the user's current view angle parameter is equal to a preset reference angle parameter; if yes, adjusting the block color density and block brightness of at least one block in the display device according to a preset reference block color density value and a preset reference block brightness value; and if no, determining a parameter interval to which the current view angle parameter belongs, and adjusting the block color density and the block brightness of at least one block in the display device according to a block color density value and a block brightness value corresponding to the parameter interval.

Some exemplary embodiment further provide a display adjustment apparatus, comprising: a data collector configured to collect a user's personal feature information and usage information of the user using the display device; and a display adjuster configured to adjust a display effect of the display device according to at least one of the personal feature information or the usage information.

Some exemplary embodiments further provide a display device comprising the display adjustment apparatus as described above.

Some exemplary embodiments further provide a computer device comprising: a memory, a processor, and a computer program stored on the memory and executable on the processor; the processor implements the steps of the display adjustment method according to the embodiments of the present disclosure when executing the program.

Some exemplary embodiments further provide a computer readable storage medium storing a computer program that, when executed, implements the steps of the display adjustment method according to the embodiments of the present disclosure.

Additional aspects and advantages of the present disclosure will be partially given in the following depictions, become apparent from the following depictions or are learn about from the practice of the present disclosure.

BRIEF DESCRIPTION OF THE DRAWINGS

The above and/or additional aspects and advantages of the present disclosure will become apparent and readily understood from FIG. 1 is a schematic flowchart of a display adjustment method according to an exemplary embodiment.

DETAILED DESCRIPTION

Figure 1:
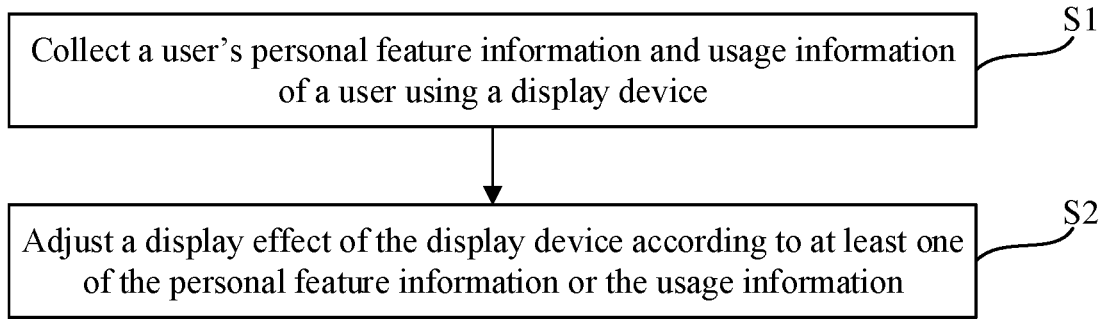

Exemplary embodiments are described in detail below. The exemplary embodiments are illustrated in the figures, wherein the same or similar reference numerals indicate the same or similar elements or elements having the same or similar functions. The embodiments described below with reference to the figures are exemplary and only intended to illustrate the present disclosure, and cannot be construed as limiting the present disclosure.

Those skilled in the art may appreciate that singular forms "a", "an", "said" and "the" used herein may also comprise plural forms unless otherwise stated. It should be further appreciated that the word "comprise" used in the specification means existence of the feature, integer, step, operation, element and/or component, but does not exclude existence or addition of one or more other features, integers, steps, operations, elements, component and/or a group thereof. It should be appreciated that when an element is referred to as being "connected" or "coupled" to another element, it may be directly connected or coupled to the other elements, or connected or coupled via an intermediate element. Herein, "connect" or "couple" used herein may comprise wireless connection or wireless coupling. The wording "and/or" used herein comprises all or any one and all combinations of one or more associated items as listed.

Those skilled in the art may appreciate that all terms (including technical terms and scientific terms) used herein have the same meaning as commonly understood by one of ordinary skill in the art to which the present disclosure belongs, unless otherwise defined. It should also be understood that terms such as those defined in a general dictionary should be understood to have meaning consistent with the meaning in the context of the prior art, and will not be explained with idealized or too formal meaning unless otherwise particularly defined here.

In order to reduce the impact of a display device on the health of a user's eyes, approaches in the relevant art generally remind the user to change a usage posture, to reduce usage duration or to suspend the use of the display device. However, these approaches rely on the user's self-control to a large extent. For users with low self-control, they might fail to make corresponding changes even if they receive a reminder. Therefore, these approaches have poor protection effects on the eyes and cannot meet the needs of users. Users urgently need a more effective way to protect their eyes.

Exemplary embodiments of the present disclosure provide smart eye protection techniques. According to an embodiment of the present disclosure, by collecting information of a user of a display device, display parameters of the display device, such as resolution, color density, sharpness, brightness and blue light intensity, may be adjusted according to the user's information, so that the display device may produce a personalized display effect adapted for the user, thereby protecting the user's eyes. Since the display effect is better matched with the user's personal needs, the user is enabled to use the display device more comfortably and for a longer period of time while his eyes are protected.

FIG. 1 shows a schematic flowchart of a display adjustment method according to an exemplary embodiment. As shown in FIG. 1, the method comprises the following steps.

At S1, personal information of a user who uses a display device is collected. The personal information may comprise at least one of personal feature information or usage information of the user using the display device.

In some exemplary embodiments, when the personal feature information is collected, the user's facial information may be first collected; and analysis is performed according to the facial information to obtain the user's personal feature information. In some embodiments, personal information may be collected and updated periodically to improve the real-time performance of personal information collection.

Optionally, the facial information may comprise feature information such as facial texture features, pupil state features (e.g., pupil distance, and pupil size). Facial information may be collected by a face recognition sensor. The face recognition sensor may be, for example, an AHD (Analog High Definition) high definition camera.

Optionally, the personal feature information comprises age information and eyesight information. The age information may be specific age data, such as 10 years old, 20 years old, or 30 years old. It may also be data indicating an age range, such as teenagers, the middle-aged, and the aged. The eyesight information may be a specific degree of myopia, or an approximate degree of myopia, such as normal, mild myopia, moderate myopia, and deep myopia.

Since users of different ages or in different age groups have different facial texture features, the user's age information may be obtained by analyzing according to the facial texture features. Since users with different eyesight have different pupil state features of their eyes, the user's eyesight information may be obtained by analyzing according to the pupil state features.

In another exemplary embodiment, obtaining the user's personal feature information by analyzing according to the facial information comprises: obtaining preliminary age information by analyzing according to the facial texture features, and obtaining preliminary eyesight information by analyzing according to the pupil state features. Optionally, the preliminary age information and the preliminary eyesight information may be displayed to the user, and the user's confirmation of the preliminary age information and the preliminary eyesight information may be received. Alternatively, the user may also input or re-input his age information and eyesight information as final age information and eyesight information. The accuracy of the obtained personal feature information may be further improved by analyzing the facial information or optionally requesting the user to confirm the analysis result.

Optionally, the personal feature information may also be collected in any of the following manners.

In an example, the facial information of a current user may be collected and compared with preset facial information of at least one user. If there is pre-stored facial information that matches the facial information of the current user, the pre-stored personal feature information corresponding to the pre-stored facial information is directly extracted.

In another example, the facial information of the current user may be collected and compared with pre-stored facial information of at least one user. If there is pre-stored facial information that matches the facial information of the current user, the pre-stored facial information may be directly extracted, and the personal feature information is obtained by analyzing that facial information.

The above two manners may be adapted for various application scenarios, where, for example, the same user uses the same display device multiple times or different users use the same display device.

In another exemplary embodiment, the personal feature information may be obtained according to the information input by the user, no matter whether the personal feature information is collected for the first time or collected again. Exemplarily, the personal feature information such as age and eyesight conditions may be manually input directly by the user.

Optionally, the usage information comprises: usage time information, and distance information and view angle information between the eyes and the display device. The usage time information is used to indicate time duration in which the user uses the display device. The usage time information may be collected by a timing device or a built-in timing component of the display device. For example, a time period during which the display device is in an unlocked state or the screen of the display device is illuminated may be considered as the usage time of the display device. The distance information is used to indicate the distance between the user and the display device. In one example, the distance information may be measured by a time difference of infrared signals transmitted and received by the AHD high definition camera equipped on the display device. The view angle information may be used to indicate an angle of the user's line of sight relative to the display device (e.g., relative to a direction perpendicular to a certain reference plane related to the display device, such as a plane where the screen lies, namely, an imaging plane). In an example, the view angle information may be measured from an angle of infrared signals transmitted and received by the AHD high definition camera.

Optionally, the usage information may also be obtained according to information input by the user.

At S2, the display effect of the display device is adjusted according to the collected personal information. In some exemplary embodiments, adjustment of one or more display parameters of the display device is performed according to at least one of the collected personal feature information or usage information. The display parameters may comprise, but are not limited to, resolution, brightness, contrast, blue light intensity, color density and sharpness for a whole display area of the display device, and block color density and block brightness for some display blocks of the display device.

In some exemplary embodiments, at least one display parameter of the display device may be adjusted according to at least one of the age information, eyesight information, distance information or view angle information.

Optionally, adjusting the display effect of the display device according to the personal information comprises at least one of the following steps:

Step 1) adjusting the resolution of the display device according to the age information and the eyesight information.

Step 2) adjusting the brightness and blue light intensity of the display device according to the distance information and the usage time information.

Step 3) adjusting the color density and sharpness of the display device according to the distance information.

Step 4) adjusting the block color density and the block brightness of the display device according to the view angle information.

It may be appreciated that although the age information is used to adjust the resolution of the display device in the above embodiment, the present disclosure is not limited thereto. Exemplarily, age information may also be used to adjust brightness and/or contrast, etc., taking into account differences in sensitivity of users in different age groups to other display effects.

It will be appreciated that one or more of the display parameters may also be adjusted accordingly based on other suitable different combinations of the personal information according to the embodiment of the present disclosure.

By the adjustment according to the exemplary embodiment, the display effect of a display device may be optimally adapted to a user's personal features or a current use condition thereof, thereby achieving the effect of protecting the user's eyes. For example, by step 1), the resolution of the display device may be enabled to meet the user's age and eyesight requirements to a maximum degree, thereby reducing the effect of a certain resolution on eye health of a user at a particular age and with particular eyesight.

Figure 2:
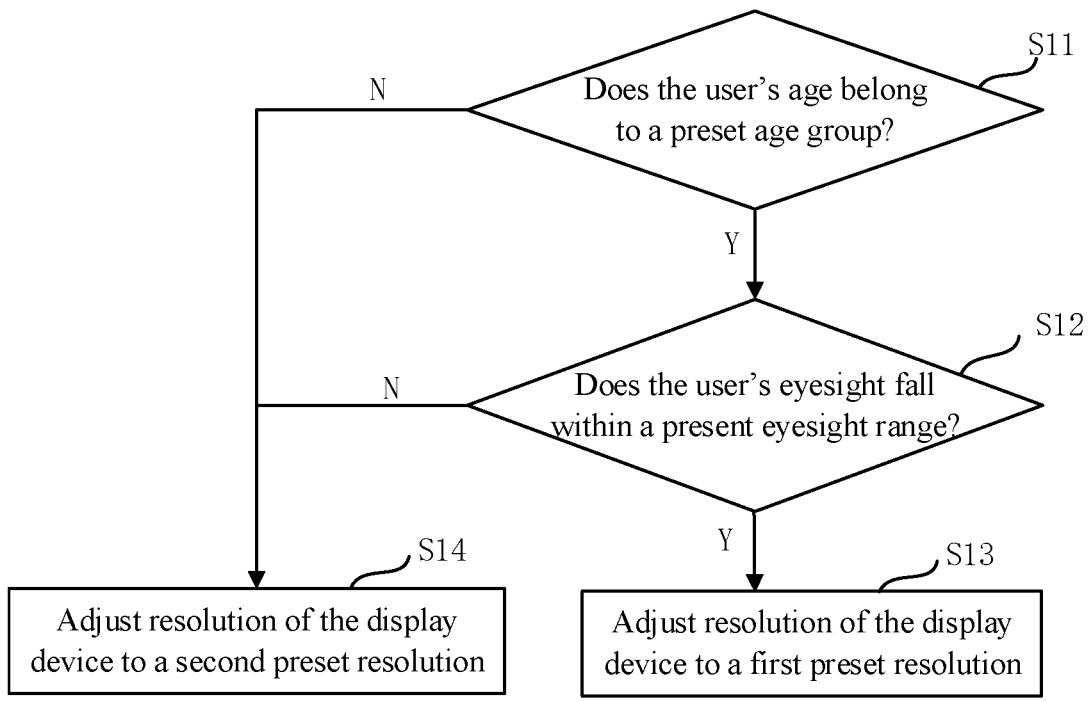
FIG. 2 is a schematic flowchart of adjusting resolution of a display device according to age information and eyesight information according to an exemplary embodiment.

FIG. 2 exemplarily illustrates a schematic flowchart of adjusting a resolution of a display device according to age information and eyesight information.

At S11, whether the user's age belongs to a preset age group is determined according to the age information. If yes, S12 is performed, and if no, S14 is performed. In some embodiments, the preset age group may be set as desired. For example, the preset age group comprises an age group corresponding to teenagers or the middle-aged, or a total age group corresponding to both. In the following, the total age group corresponding to teenagers and the middle-aged will be taken as an example for further illustration.

At S12, whether the user's eyesight falls within a preset eyesight range is determined according to the eyesight information. If yes, S13 is performed, and if no, S14 is performed. In some embodiments, the preset eyesight range may be set as desired. For example, the preset eyesight range may be an eyesight range corresponding to normal eyesight, or may be an eyesight range corresponding to mild myopia (e.g., less than 300 degrees) or moderate myopia (e.g., 300 degrees to 600 degrees). In the following, a total eyesight range corresponding to normal eyesight and mild myopia will be taken as an example for further illustration.

At S13, resolution of the display device is adjusted to a first preset resolution.

At S14, the resolution of the display device is adjusted to a second preset resolution.

Here, the first preset resolution is an optimal resolution corresponding to the preset age group and the preset eyesight range. The second preset resolution is less than the first preset resolution. It may be understood that the specific magnitude relationship between the first preset resolution and the second preset resolution is not limited thereto, but may be set according to actual needs.

In the above example, it is helpful to protect the eye health of older users by appropriately lowering the resolution for those users.

In an example, it is assumed that the age range corresponding to the preset age group comprises teenagers and the middle-aged, and the preset eyesight range comprises normal eyesight and mild myopia. In this example, a determination as to whether the user's age belongs to the teenagers and the middle-aged is made according to the age information. If the user's age belongs to teenagers or the middle-aged, whether the user's eyesight is normal eyesight or mild myopia is determined according to the user's eyesight information. If the user's age belongs to an age group other than teenagers and the middle-aged, such as the aged, the resolution of the display device is adjusted to $(H/2) \times (V/2)$. If the user's eyesight is normal eyesight or mild myopia, the resolution of the display device is adjusted to $H \times V$. If the user's eyesight is in an eyesight range other than normal eyesight and mild myopia, for example moderate myopia or deep myopia (e.g., greater than 600 degrees), the resolution of the display device is adjusted to $(H/2) \times (V/2)$. Here, H represents the number of pixels per row of the display device, and V represents the number of pixels per column of the display device.

Figure 3:
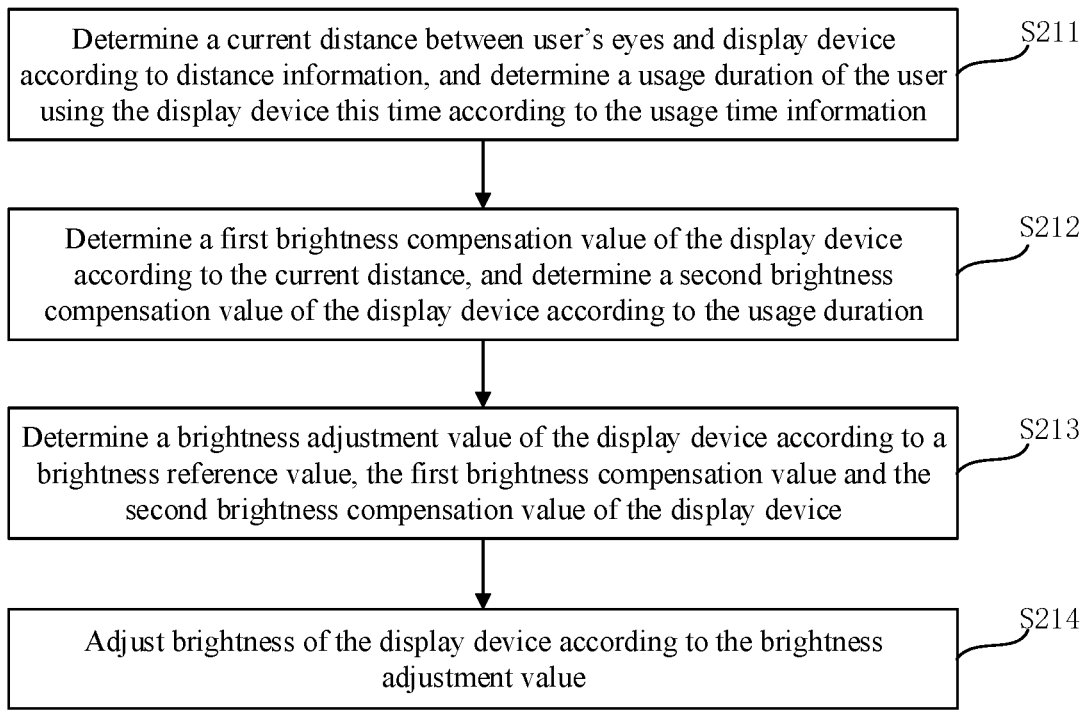
FIG. 3 is a schematic flowchart of adjusting brightness of a display device according to distance information and usage time information according to an exemplary embodiment.

FIG. 3 exemplarily shows a flowchart for adjusting brightness of the display device according to the distance information and the usage time information.

At S211, a current distance between the user's eyes and the display device is determined according to the distance information. A usage duration of the user using the display device this time is determined according to the usage time information.

At S212, a first brightness compensation value of the display device is determined according to the current distance, and a second brightness compensation value of the display device is determined according to the current usage time.

At S213, a brightness adjustment value of the display device is determined according to a brightness reference value of the display device, the first brightness compensation value, and the second brightness compensation value.

At S214, the brightness of the display device is adjusted according to the brightness adjustment value.

Optionally, the step S212 may comprise: determining a distance interval to which the current distance belongs, and making a brightness compensation value corresponding to the distance interval serve as the first brightness compensation value, and determining a time interval to which the current usage time belongs, and making a brightness compensation value corresponding to the time interval serve as the second brightness compensation value.

Further optionally, before step S212, the method further comprises: setting first brightness compensation values corresponding to respective distance intervals according to magnitude relationships between different distances and a preset reference distance. Alternatively, as used herein, the reference distance may serve as a separate distance interval and not belong to the same distance interval as other distance values.

Exemplarily, if a certain distance is equal to the reference distance, the first brightness compensation value corresponding to the distance interval to which the distance belongs is set to zero. If a certain distance is greater than the reference distance, the first brightness compensation value corresponding to the distance interval to which the distance belongs is set to a positive value (i.e., dim up the display device). If a certain distance is smaller than the reference distance, the first brightness compensation value corresponding to the distance interval to which the distance belongs is set to a negative value (that is, dim down the display device).

Further optionally, the second brightness compensation values corresponding to respective time intervals may be set by: setting the second brightness compensation values corresponding to respective time intervals according to lengths of different usage times.

Exemplarily, if a certain usage time is 0 h (0 hours), that is, the user has not yet started using the display device; the second brightness compensation value corresponding to this usage time is set to 0. If a certain usage time is greater than 0 h, the second brightness compensation value corresponding to this time interval to which the usage time belongs is set to a negative value.

Optionally, in step S213, the brightness adjustment value is equal to a sum of the brightness reference value, the first brightness compensation value and the second brightness compensation value. For example, if the brightness reference value is X $cd/m^2$ (candela/square meter), the first brightness compensation value is (+a) $cd/m^2$, and the second brightness compensation value is (−b) $cd/m^2$, the brightness adjustment value is =(X+a−b) cd/m2. If the first brightness compensation value is (−a) $cd/m^2$, the brightness adjustment value=(X−a−b) $cd/m^2$.

In an exemplary embodiment, the reference distance and its corresponding brightness reference value are all preset. The reference distance may be an optimal use distance of the display device. The brightness reference value may be a brightness value corresponding to the reference distance when the usage time is 0.

In an exemplary embodiment, a distance interval(s) is preset, and the number thereof may be one or more. The size and number of distance intervals may be set according to actual needs. Each distance interval corresponds to a brightness compensation value or a first brightness compensation value. For example, the distance between the eyes and the screen may be divided into a total of 12 distance intervals: 0-15 cm (centimeter), 15-25 cm, 25-35 cm, 35-45 cm, 45-55 cm, 55-65 cm, 65-75 cm, 75-85 cm, 85-95 cm, 95-110 cm, 110-130 cm and 130-160 cm, respectively corresponding to 12 brightness compensation values or first brightness compensation values.

When a plurality of distance intervals is set, the plurality of distance intervals may be selected as a plurality of intervals consecutive in the distance to achieve continuous regulation of the brightness. The larger the value of the distance corresponding to the distance interval is, the farther the user's eyes are away from the screen, and accordingly the larger the brightness compensation value or the first brightness compensation value corresponding to the distance interval is.

In an exemplary embodiment, a time interval(s) is preset, and the number thereof may be one or more. The size and number of time intervals may be set according to actual needs. Each time interval corresponds to a brightness compensation value or a second brightness compensation value. For example, the usage time may be divided into a total of 12 time intervals 0-0.5 h, 0.5-1 h, 1-1.5 h, 1.5-2 h, 2-2.5 h, 2.5-3 h, 3-3.5 h, 3.5-4 h, 4-4.5 h, 4.5-5 h, 5-5.5 h and 5.5-6 h according to the length of time, respectively corresponding to 12 brightness compensation values or second brightness compensation values.

When a plurality of time intervals are set, the plurality of time intervals may be selected as a plurality of intervals consecutive in time to achieve continuous regulation of the brightness. The larger the value of the time corresponding to the time interval is, the longer the time of the user using the display device is, and accordingly the smaller the brightness compensation value or the second brightness compensation value corresponding to the time interval is.

In exemplary embodiments it is helpful to protect the eye health of users who are at a closer distance and with a longer usage time by appropriately lowering the brightness of the display device for those users.

Figure 4:
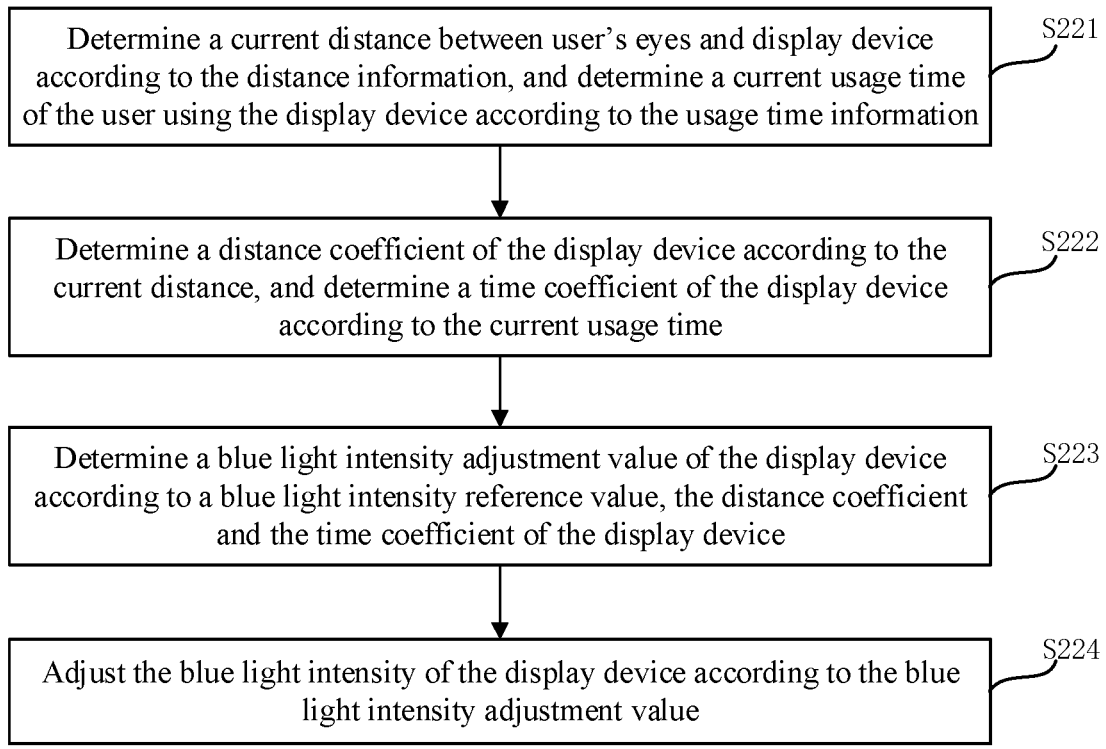
FIG. 4 is a schematic flowchart of adjusting blue light intensity of a display device according to distance information and usage time information according to an exemplary embodiment.

FIG. 4 exemplarily shows a flowchart for adjusting blue light intensity of the display device based on the distance information and the usage time information.

At S221, a current distance between the user's eyes and the display device is determined according to the distance information, and a usage duration of the user using the display device this time is determined according to the usage time information.

At S222, a distance coefficient of the display device is determined according to the current distance, and a time coefficient of the display device is determined according to the current usage time.

At S223, a blue light intensity adjustment value of the display device is determined according to a blue light intensity reference value, the distance coefficient, and the time coefficient of the display device.

At S224, the blue light intensity of the display device is adjusted according to the blue light intensity adjustment value.

Optionally, the step S222 may comprise: determining a distance interval to which the current distance belongs, and making a distance coefficient value corresponding to the distance interval serve as a distance coefficient value of the display device; and determining a time interval to which the current usage time belongs, and making a time coefficient corresponding to the time interval serve as a time coefficient value of the display device.

Further optionally, the distance coefficient values corresponding to respective distance intervals and the time coefficient values corresponding to respective time intervals may be set by: setting the distance coefficient values corresponding to respective distance intervals according to magnitude relationships between different distances and a preset reference distance; and setting the time coefficient values corresponding to respective time intervals according to lengths of different usage times.

Exemplarily, if a certain distance is greater than or equal to the reference distance, the distance coefficient value corresponding to the distance interval to which the distance belongs is set to 1. If a certain distance is smaller than the reference distance, the distance coefficient value corresponding to the distance interval to which the distance belongs is set to a value smaller than 1.

Exemplarily, if the usage time is 0 h, that is, the user has not yet started using the display device, the time coefficient value corresponding to this usage time is set to 1. If the usage time is greater than 0 h, the time coefficient corresponding to the time interval to which this usage time belongs is set to a value less than 1.

Optionally, in step S223, the blue light intensity adjustment value is equal to a product of the blue light intensity reference value, the distance coefficient and the time coefficient.

For example, if the blue light intensity value is represented by X, the distance coefficient is represented by Gary1, the time coefficient is represented by Gary2, the distance coefficient corresponding to the reference distance is set to Gary1=1, and the time coefficient when the usage time is 0 h is Gary2=1, the blue light intensity reference value=X×Gary1×Gary 2=X. At other distances, the blue light intensity adjustment value=X×Gary1×Gary2.

In an exemplary embodiment, the reference distance and its corresponding blue light intensity reference value are both preset. The blue light intensity reference value may be an optimal blue light intensity value corresponding to the reference distance when the usage time is zero.

In an exemplary embodiment, the setting of the distance interval and the time interval are as described above. In one example, each distance interval corresponds to a distance coefficient value, and the larger the distance corresponding to the distance interval is, the farther the user's eyes are away from the screen, and accordingly the larger the distance coefficient value corresponding to the distance interval is. Each time interval corresponds to a time coefficient, the larger the value of the time corresponding to the time interval is, the longer the time of the user using the display device is, and accordingly the smaller the time coefficient corresponding to the time interval is.

Through the above exemplary embodiment, it is helpful to protect the eye health of users who are at a closer distance and with a longer usage time by appropriately lowering the blue light intensity of the display device for such users.

Figure 5:
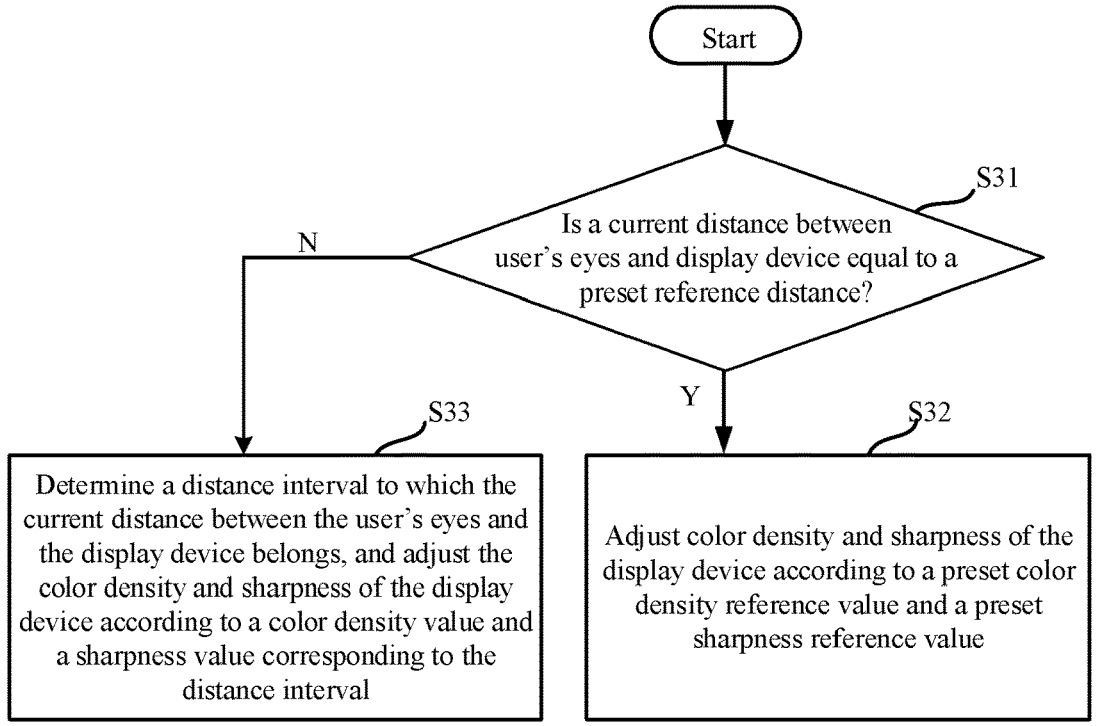
FIG. 5 is a schematic flowchart of adjusting color density and sharpness of a display device according to distance information according to an exemplary embodiment.

FIG. 5 exemplarily shows a flowchart for adjusting the color density and sharpness of the display device according to the distance information.

At S31, whether the current distance between the user's eyes and the display device is equal to a preset reference distance is determined according to the distance information. If yes, S32 is performed, and if not, S33 is performed.

At S32, the color density and sharpness of the display device are adjusted according to a preset color density reference value and a preset sharpness reference value.

At S33, a distance interval to which the current distance between the user's eyes and the display device belongs is determined, and the color density and sharpness of the display device are adjusted according to the color density value and the sharpness value corresponding to the distance interval.

Through the above steps, it is helpful to protect the eye health of users who are at a closer distance by appropriately lowering the overall color density and sharpness of the display device for those users.

Optionally, in the above step S33, the color density of the display device comprises density of three sub-colors red, green and blue. The density of the three sub-colors may be represented by a red light intensity parameter $X_R$, a green light intensity parameter $X_G$ and a blue light intensity parameter $X_B$, respectively.

Optionally, the above step S33 may comprise: upon adjusting the color density of the display device, determining a distance interval to which the current distance between the user's eyes and the display device belongs, and determining values of a first distance coefficient, a second distance coefficient and a third distance coefficient according to the distance interval; wherein the first distance coefficient, the second distance coefficient and the third distance coefficient are distance coefficients of three colors red, green and blue, respectively. The value of the color density of the display device is determined according to the values of the first distance coefficient, the second distance coefficient and the third distance coefficient, in combination with a first reference value, a second reference value and a third reference value for the density of the three sub-colors red, green and blue, and the color density of the display device is adjusted according to the value of the color density.

Exemplarily, if the first distance coefficient is represented by $Gary_R$, the second distance coefficient is represented by $Gary_G$, the third distance coefficient is represented by $Gary_B$, and the first distance coefficient $Gary_R$, the second distance coefficient $Gary_G$ and the third distance coefficient $Gary_B$ corresponding to the reference distance are all set to 1, the color density reference value=$(X_R \times Gary_R) \times (X_G \times Gary_G) \times (X_B \times Gary_B) = X_R \times X_G \times X_B$. When the user is at other distances, the color density value of the display device=$(X_R \times Gary_R) \times (X_G \times Gary_G) \times (X_B \times Gary_B)$.

Optionally, the values of the first distance coefficient $Gary_R$, the second distance coefficient $Gary_G$ and the third distance coefficient $Gary_B$ corresponding to respective distance intervals may be set in the following manner: if a distance is equal to the reference distance, the values of the first distance coefficient $Gary_R$, the second distance coefficient $Gary_G$ and the third distance coefficient $Gary_B$ corresponding to the distance interval to which the distance belongs are all set to 1; if a certain distance is smaller than the reference distance, the values of the first distance coefficient $Gary_R$, the second distance coefficient $Gary_G$ and the third distance coefficient $Gary_B$ corresponding to the distance interval to which the distance belongs are all set to values smaller than 1; if a distance is greater than the reference distance, the values of the first distance coefficient $Gary_R$, the second distance coefficient $Gary_G$ and the third distance coefficient $Gary_B$ corresponding to the distance interval to which the distance belongs are all set to values greater than 1.

Figure 6:
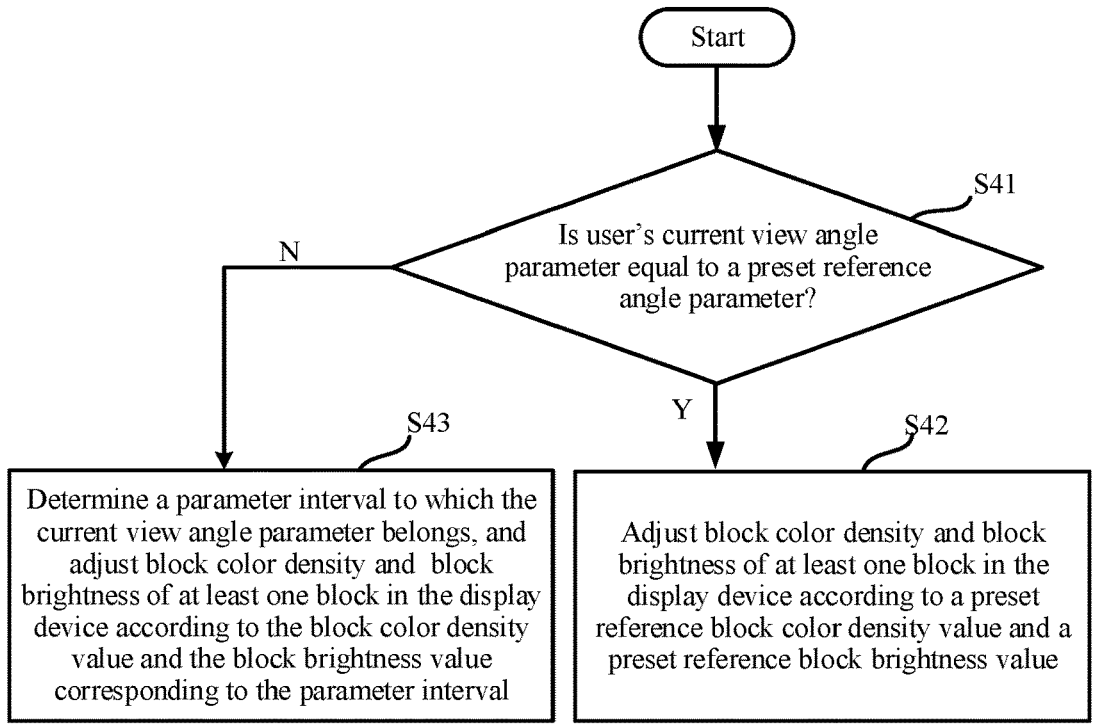
FIG. 6 is a schematic flowchart of adjusting block color density and block brightness of a display device according to view angle information according to an exemplary embodiment.

FIG. 6 exemplarily shows a flowchart for adjusting block color density and block brightness of a display device according to view angle information.

At S41, whether the user's current view angle parameter is equal to a preset reference angle parameter is determined according to the view angle information. If yes, S42 is performed, and if not, S43 is performed.

At S42, the block color density and the block brightness of at least one block in the display device are adjusted according to a preset reference block color density value and a reference block brightness value.

At S43, a parameter interval to which the current view angle parameter belongs is determined, and the block color density and the block brightness of at least one block in the display device are adjusted according to the block color density value and the block brightness value corresponding to the parameter interval.

Exemplarily, the view angle parameter may be represented by $\Delta E$ which may be a ratio of a value of a view angle of the left eye relative to the display device to a value of a view angle of the right eye relative to the display device. When the values of the view angles of the left eye and right eye relative to the screen are measured, any plane may be selected as a reference plane. Hereinafter, the embodiment of the present disclosure will be described by taking a plane where the screen lies as the reference plane.

The reference angle parameter is a view angle parameter $\Delta E$ when the user faces the display device at a set optimal position. When the user's position changes, the view angle parameter $\Delta E$ also changes.

The change of the view angle parameter will be further described below with a specific example. Here, an example is taken in which the user faces the display device.

When the set optimal position is a position that right faces a central area of the display device, the value of the view angle of the left eye relative to the screen is equal to the value of the view angle of the right eye relative to the screen. At this time, the view angle parameter calculated according to the definition of $\Delta E$ is equal to the reference angle parameter, for example 1. When the user's position offsets toward the left side of the display device (namely, the right side of the user), the value of the view angle of the left eye relative to the screen becomes smaller, and the value of the view angle of the right eye relative to the screen becomes larger, whereupon the corresponding $\Delta E$ is less than 1. When the user's position offsets toward the right side of the display device (namely, the left side of the user), the value of the view angle of the left eye relative to the screen becomes smaller, and the value of the view angle of the right eye relative to the screen becomes larger, whereupon the corresponding ΔE is greater than 1.

In an exemplary embodiment, the block color density values and the block brightness values corresponding to respective parameter intervals may be set by: setting the block color density values and the block brightness values corresponding to respective parameter intervals according to magnitude relationships between different view angle parameters and the reference angle parameter.

Exemplarily, if the value of ΔE is equal to 1, the block color density and the block brightness of at least one block corresponding to the parameter interval are set as a preset block color density reference value and a block brightness reference value.

If ΔE is less than 1, it indicates that the user's eyes are closer to the left side of the screen and farther from the right side, the block color density of a left block that corresponds to the parameter interval is set to a value smaller than the block color density reference value, and the block brightness is set to a value smaller than the block brightness reference value; the block color density of a right block that corresponds to the parameter interval is set to a value larger than the block color density reference value, and the block brightness is set to a value larger than the block brightness reference value.

If ΔE is greater than 1, it indicates that the user's eyes are closer to the right side of the screen and farther from the left side, the block color density of a right block that corresponds to the parameter interval is set to a value smaller than the block color density reference value, and the block brightness is set to a value smaller than the block brightness reference value; the block color density of a left block that corresponds to the parameter interval is set to a value larger than the block color density reference value, and the block brightness is set to a value larger than the block brightness reference value.

Another exemplary embodiment further comprises: displaying reminder information on the display device according to the age information and the usage time information.

Optionally, a reminder dialog box is displayed on the display device every preset time interval according to the user's age or age group and the duration of the user using the display device this time, to show reminder information such as the current usage time and recommended rest time to the user.

In an exemplary embodiment, when the user is a teenager or an old man, the preset time interval may be set to a first preset interval, such as 30 minutes. When the user is young or middle-aged, the preset time interval may be set to a second preset interval, such as 1 hour. The second preset time is greater than the first preset time.

In an exemplary embodiment, the preset time interval may be set to a third preset time (for example, 5 minutes) when the duration of single use exceeds a preset time threshold (for example, 2.5 hours) regardless of the age of the user. Moreover, the text and background of the reminder information may be set to a conspicuous color, such as red, to achieve a better reminder effect. For example, it is possible to display the following text of reminder information on the screen: "You have been using it for n hours, and it is recommended according to your physical condition that you have a rest for m minutes before continuing to use" and set the background of the text to red, wherein n and m are both a real number greater than zero.

Figure 7:
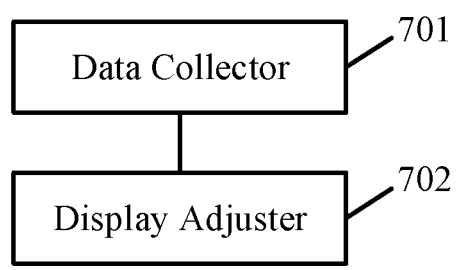
FIG. 7 is a schematic structural diagram of a display adjustment apparatus according to an exemplary embodiment.

FIG. 7 shows a schematic structural diagram of a display adjustment apparatus according to an embodiment of the present disclosure. As shown in FIG. 7, the display adjustment device comprises a data collector 701 and a display adjuster 702.

The data collector 701 is configured to collect a user's personal information, including the user's personal feature information and usage information of the user using the display device. Optionally, the data collector 701 further comprises: a data collection unit and a data analysis unit, wherein the data collection unit is configured to obtain the user's facial information; and the data analysis unit is configured to obtain the user's personal feature information according to the facial information.

The display adjuster 702 is configured to adjust a display effect of the display device according to the personal information, such as at least one of the personal feature information or usage information. Exemplarily, the display adjuster 702 generates one or more of a resolution adjustment instruction, a brightness adjustment instruction, a blue light intensity adjustment instruction, a color density and sharpness adjustment instruction, and a block color density and brightness adjustment instruction according to at least one of personal feature information or usage information, and correspondingly adjusts at least one of a resolution, a screen overall brightness, a blue light intensity, a color density, a sharpness, a block color density, or a block brightness of the display device respectively according to the above instructions.

In some exemplary embodiments, the data collector and display adjuster may be implemented in the form of a data acquisition module and a display adjustment module. As used in the present application, the term "module" is generally intended to refer to a computer-related entity, either hardware, a combination of hardware and software, software, or software in execution. For example, a module may be a process running on a processor, a processor, an object, an executable file, a thread of execution, a program and/or a computer, but is not limited thereto. For example, both an application running on a controller and the controller may be a module. One or more modules may reside within a process and/or thread of execution, and a module may be limited to one computer and/or distributed between two or more computers.

It may be appreciated that embodiments of the method correspond to embodiments of the apparatus. All possibilities discussed with respect to FIG. 1-FIG. 6 are also applicable for FIG. 7.

Figure 8:
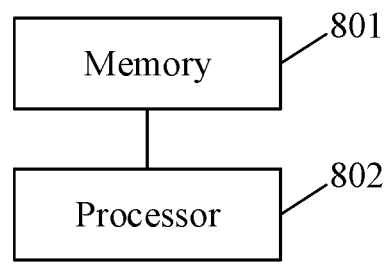
FIG. 8 is a schematic structural diagram of a display device according to an exemplary embodiment.

FIG. 8 is a schematic structural diagram of a display device according to an embodiment of the present disclosure. As shown in FIG. 8, the display device comprises a memory 801, a processor 802, and a computer program stored on the memory 801 and executable on the processor 802. The processor 802 implements the steps of the display adjustment method provided by the embodiments of the present disclosure when executing the program.

An exemplary embodiment further provides a computer readable storage medium having stored thereon a computer program, the computer program being executed to implement the steps of the display adjustment method provided by the embodiments of the present disclosure.

Optionally, the computer readable medium comprises, but is not limited to, any type of disk (including a floppy disk, a hard disk, an optical disk, a CD-ROM, and a magneto-optical disk), a ROM (Read-Only Memory), a RAM (Random Access Memory), EPROM (Erasable Programmable Read-Only Memory), EEPROM (Electrically Erasable Programmable Read-Only Memory), flash memory, magnetic card or optical card. That is, the readable medium comprises any medium to which information is stored or transmitted by a device (e.g., a computer) in a readable form.

One or more of the following advantageous effects may be obtained by applying the embodiments of the present disclosure:

Transforming from a conventional method of changing the user's use habit and usage time to dynamic adjustment of the display effect of a display device reduces the damages exerted by the display effect to the user's eyes. The user can be enabled to use the display device for a longer period of time under the condition that the eye health is less affected, thereby satisfying the user's use requirement.

Dynamically adjusting the display effect of the display device based on the user's personal information may enable the display effect to be better matched with the user's personalized features. As such, not only the impact of the display effect on the user's eyes may be minimized, but also the use needs of different users may be met.

In the process of dynamically adjusting the display effect of the display device, it is only required to adjust the corresponding partial display parameters, or adjust partial blocks of the display device, without adjusting all display parameters or all blocks of the display device. Thereby, on the basis of meeting the user's needs, the operation processes may be reduced, and the processing resources may be saved.

Those skilled in the art may appreciate that each block of these structural diagrams and/or block diagrams and/or flowcharts and combinations of these structural diagrams and/or block diagrams and/or flowcharts may be implemented by using computer program instructions. Those skilled in the art may appreciate that these computer program instructions may be implemented by being supplied to a general-purpose computer, a dedicated computer or a processor of other programmable data processing methods, such that the computer or the processor of other programmable data processing methods performs the solution designated by a block or more blocks in the structural diagrams and/or block diagrams and/or flowcharts disclosed by the present disclosure.

Those skilled in the art may understand that steps, measures and solutions in the various operations, methods and processes already discussed in the present disclosure may be alternated, modified, combined or deleted. Optionally, other steps, measures and solutions in the various operations, methods and processes already discussed in the present disclosure may also be alternated, modified, rearranged, decomposed, combined or deleted. Optionally, the steps, measures and solutions in the various operations, methods and processes disclosed in the present disclosure and existing in the prior art may also be alternated, modified, rearranged, decomposed, combined or deleted.

What are described above are only partial and exemplary embodiments of the present disclosure. It should be appreciated that those having ordinary skill in the art may also make several improvements and modifications without departing from the principles of the present disclosure, and these improvements and modifications should also be considered as falling within the scope of protection of the present disclosure.

The invention claimed is:

1. A display adjustment method, comprising:
collecting a user's personal feature information and usage information of the user using a display device;
adjusting a display effect of the display device according to at least one of the personal feature information or the usage information
wherein said adjusting the display effect of the display device comprises: adjusting one or more of display parameters of the display device according to the usage information, the usage information comprising view angle information indicating an angle of the user's line of sight relative to the display device and the display parameters comprising block color density and block brightness for some display blocks of the display device;
wherein said adjusting one or more of display parameters of the display device comprises:
determining whether the user's current view angle parameter is equal to a preset reference angle parameter according to the view angle information;
if yes, adjusting the block color density and block brightness of at least one block in the display device according to a preset reference block color density value and a preset reference block brightness value; and
if no, determining a parameter interval to which the current view angle parameter belongs, and adjusting the block color density and the block brightness of at least one block in the display device according to a block color density value and a block brightness value corresponding to the parameter interval.

2. The method according to claim 1, wherein the personal feature information comprises: the user's age information and eyesight information; the usage information further comprises: usage time information indicating a usage duration of the user using the display device, and distance information indicating a distance between the user's eyes and the display device; and
said adjusting the display effect of the display device further comprises: adjusting one or more of display parameters of the display device according to the personal feature information.

3. The method according to claim 2, wherein the display parameters further comprise resolution, brightness, contrast, blue light intensity, color density and sharpness of a whole display area of the display device.

4. The method according to claim 3, wherein said adjusting the display parameters of the display device further comprises at least one of the following:
adjusting the resolution of the display device according to the age information and the eyesight information;
adjusting the brightness and the blue light intensity of the display device according to the distance information and the usage time information; or
adjusting the color density and the sharpness of the display device according to the distance information.

5. The method according to claim 4, wherein said adjusting the resolution of the display device according to the age information and the eyesight information comprises:
determining whether the user's age belongs to a preset age group according to the age information;
determining whether the user's eyesight falls within a preset eyesight range according to the eyesight information when the user's age belongs to the preset age group, and if yes, adjusting the resolution of the display device to a first preset resolution, otherwise, adjusting the resolution of the display device to a second preset resolution; and
adjusting the resolution of the display device to a second preset resolution when the user's age does not belong to the preset age group, wherein the second preset resolution is different from the first preset resolution.

6. The method according to claim 4, wherein said adjusting the brightness of the display device according to the distance information and the usage time information comprises:
  determining a current distance between the user's eyes and the display device according to the distance information, and determining a usage duration of the user using the display device this time according to the usage time information;
  determining a first brightness compensation value of the display device according to the current distance, and determining a second brightness compensation value of the display device according to the usage duration;
  determining a brightness adjustment value of the display device according to a brightness reference value, the first brightness compensation value and the second brightness compensation value of the display device; and
  adjusting the brightness of the display device according to the brightness adjustment value.

7. The method according to claim 4, wherein said adjusting the blue light intensity of the display device according to the distance information and the usage time information comprises:
  determining a current distance between the user's eyes and the display device according to the distance information, and determining a usage duration of the user using the display device this time according to the usage time information;
  determining a distance coefficient of the display device according to the current distance, and determining a time coefficient of the display device according to the usage duration;
  determining a blue light intensity adjustment value of the display device according to a blue light intensity reference value, the distance coefficient and the time coefficient of the display device; and
  adjusting the blue light intensity of the display device according to the blue light intensity adjustment value.

8. The method according to claim 4, wherein said adjusting the color density and sharpness of the display device according to the distance information comprises:
  determining whether a current distance between the user's eyes and the display device is equal to a preset reference distance according to the distance information;
  if yes, adjusting the color density and the sharpness of the display device according to a preset color density reference value and a preset sharpness reference value; and
  if no, determining a distance interval to which the current distance between the user's eyes and the display device belongs, and adjusting the color density and the sharpness of the display device according to a color density value and a sharpness value corresponding to the distance interval.

9. The method according to claim 5, wherein said adjusting the brightness of the display device according to the distance information and the usage time information comprises:
  determining a current distance between the user's eyes and the display device according to the distance information, and determining a usage duration of the user using the display device this time according to the usage time information;
  determining a first brightness compensation value of the display device according to the current distance, and determining a second brightness compensation value of the display device according to the usage duration;
  determining a brightness adjustment value of the display device according to a brightness reference value, the first brightness compensation value and the second brightness compensation value of the display device; and
  adjusting the brightness of the display device according to the brightness adjustment value.

10. The method according to claim 5, wherein said adjusting the blue light intensity of the display device according to the distance information and the usage time information comprises:
  determining a current distance between the user's eyes and the display device according to the distance information, and determining a usage duration of the user using the display device this time according to the usage time information;
  determining a distance coefficient of the display device according to the current distance, and determining a time coefficient of the display device according to the usage duration;
  determining a blue light intensity adjustment value of the display device according to a blue light intensity reference value, the distance coefficient and the time coefficient of the display device; and
  adjusting the blue light intensity of the display device according to the blue light intensity adjustment value.

11. The method according to claim 5, wherein said adjusting the color density and sharpness of the display device according to the distance information comprises:
  determining whether a current distance between the user's eyes and the display device is equal to a preset reference distance according to the distance information;
  if yes, adjusting the color density and the sharpness of the display device according to a preset color density reference value and a preset sharpness reference value; and
  if no, determining a distance interval to which the current distance between the user's eyes and the display device belongs, and adjusting the color density and the sharpness of the display device according to a color density value and a sharpness value corresponding to the distance interval.

12. A display adjustment apparatus, comprising:
  a data collector configured to collect a user's personal feature information and usage information of the user using the display device; and
  a display adjuster implemented by a processor and configured to adjust a display effect of the display device according to at least one of the personal feature information or the usage information;
  wherein the display adjuster is further configured to adjust one or more of display parameters of the display device according to the usage information, the usage information comprising view angle information indicating an angle of the user's line of sight relative to the display device and the display parameters comprising block color density and block brightness for some display blocks of the display device;
  wherein the display adjuster is further configured to:
    determine whether the user's current view angle parameter is equal to a preset reference angle parameter according to the view angle information;

if yes, adjust block color density and block brightness of at least one block in the display device according to a preset reference block color density value and a preset reference block brightness value; and if no, determine a parameter interval to which the current view angle parameter belongs, and adjust the block color density and the block brightness of at least one block in the display device according to a block color density value and a block brightness value corresponding to the parameter interval.

13. The display adjustment apparatus according to claim 12, wherein the personal feature information further comprises: the user's age information and eyesight information; the usage information comprises: usage time information indicating a usage duration of the user using the display device, and distance information indicating a distance between the user's eyes and the display device; and the display adjuster is further configured to adjust one or more of display parameters of the display device according to the personal feature information.

14. The display adjustment apparatus according to claim 13, wherein the display adjuster is further configured to perform at least one of the following:

adjustment of resolution of the display device according to the age information and the eyesight information;

adjustment of brightness and blue light intensity of the display device according to the distance information and the usage time information; or adjustment of color density and sharpness of the display device according to the distance information.

15. The display adjustment apparatus according to claim 13, wherein the display adjuster is further configured to:

determine a current distance between the user's eyes and the display device according to the distance information, and determine a usage duration of the user using the display device this time according to the usage time information;

determine a distance coefficient of the display device according to the current distance, and determine a time coefficient of the display device according to the usage duration;

determine a blue light intensity adjustment value of the display device according to a blue light intensity reference value, the distance coefficient and the time coefficient of the display device; and adjust the blue light intensity of the display device according to the blue light intensity adjustment value.

16. A display device, comprising the display adjustment apparatus according to claim 12.

17. A computer device, comprising: a memory, a processor, and a computer program stored on the memory and executable on the processor;

the processor implements the steps of the display adjustment method according to claim 1 when executing the program.

18. A non-transitory computer readable storage medium storing a computer program that, when executed, implements the steps of the display adjustment method according to claim 1.

* * * * *